Patented June 23, 1953

2,643,271

UNITED STATES PATENT OFFICE 2,643,271

PROCESS FOR THE PREPARATION OF
m-DINITROBENZENE

George E. Taylor and Laurence P. Russe, St. Louis, Mo., assignors to Monsanto Chemical Company, St. Louis, Mo., a corporation of Delaware No Drawing. Application October 2, 1950,
Serial No. 188,080

4 Claims. (Cl. 260—645)

This invention relates to meta-dinitrobenzene; more specifically, this invention relates to an improved commercially feasible process for the production of m-dinitrobenzene.

According to the processes heretofore described in the prior art, the direct dinitration of benzene to m-dinitrobenzene has not proven to be commercially feasible inasmuch as the crude dinitrobenzene obtained by these processes contains a significant quantity of the ortho and para isomers. For this reason, the process most frequently used for the commercial production of m-dinitrobenzene is the two-step nitration of benzene, i. e., benzene is first mononitrated to form nitrobenzene, which is then subsequently nitrated further to form a crude dinitrobenzene containing predominantly the meta isomer. Obviously, a single step process for the dinitration of benzene directly to a crude dinitrobenzene containing predominantly m-dinitrobenzene would be highly preferred over the currently used two-step nitration process.

It is an object of this invention to provide an improved process for the commercial production of a crude dinitrobenzene containing predominantly m-dinitrobenzene by the direct single step dinitration of benzene.

Other objects will become apparent from a description of the novel process of this invention.

It has now been discovered that if benzene is dinitrated under carefully controlled temperature conditions with a mixed acid containing from about 3 to about 6 parts by weight of sulfuric acid for each 1 part by weight of nitric acid, a crude dinitrobenzene results containing a significantly higher meta isomer content than heretofore obtainable in a single step dinitration process. According to this invention, therefore, benzene and a mixed acid containing from about 3 parts to about 6 parts by weight of sulfuric acid for each 1 part by weight of nitric and approximately 2 molecular proportions of nitric acid for each 1 molecular proportion of benzene are reacted at a temperature below about 80° C. It has been found that the crude dinitrobenzene recovered from such a process contains in excess of about 85% of the meta isomer. The following example is illustrative of the novel process of this invention:

Into a suitable nitration vessel are charged 263 parts by weight of 85% sulfuric acid and 175 parts by weight of benzene. With constant agitation, 1,315 parts by weight of a mixed acid containing 22.1% nitric acid and 71.4% sulfuric acid are added over a three hour period while maintaining a temperature of approximately 50° C. during the first 2½ hours of this addition period, and approximately 60° C. during the last 30 minutes of this addition period. After all of the mixed acid has been added, the temperature is then raised to about 80° C. at which temperature it is held for approximately one hour.

After the reaction is complete, 293 parts by weight of water are added to the reaction mixture and the reaction mixture agitated for an additional 5-10 minute period, while maintaining a temperature of approximately 90° C.

The reaction mixture is then allowed to settle whereupon it separates into two layers. The upper crude dinitrobenzene layer is decanted from the reaction mixture. The crude dinitrobenzene thus obtained is then washed with water and a dilute sodium sulfite solution, and then dried in an air drier at 50° C. The crystallizing point of the dinitrobenzene thus obtained is 87.5° to 88° C., indicating a meta content of 95.5%.

Procedurally, the novel process of this invention as set forth in the preceding example is subject to some variation. As previously stated, the mixed acid utilized in the novel process of this invention must contain from about 3 parts by weight to about 6 parts by weight of sulfuric acid for each 1 part of nitric acid. As also shown in the preceding example, part of the sulfuric acid may be added initially in the form of a heel or it may be supplied in toto in the mixed acid.

The quantity of the mixed acid utilized preferably should be such that approximately 2 molecular proportions of nitric acid are supplied for each 1 molecular proportions of benzene. Slight excesses of nitric acid, of the order of 5%, may be utilized.

During the reaction, the temperature should be maintained below about 80° C. Temperatures in excess of 80° C. cause the formation of excessive quantities of the ortho and para isomer, with a resultant decrease in yield of the meta isomer. Preferably, the temperature is maintained within the range of from about 30° C. to about 80° C.

After the reaction is complete, the dinitrobenzene may be recovered from the reaction mixture by any method well known to those skilled in the art. As an example, the dinitrobenzene may be separated from the reaction mixture, washed with dilute alkali and water and dried.

What is claimed is:

1. In a process for the preparation of m-dinitrobenzene by the reaction of benzene with nitric acid in admixture with sulfuric acid at a temperature in the range of 30–80° C., the ratio in parts by weight of sulfuric acid to nitric acid incorporated in the reaction mixture being 3–6:1 and the ratio in molecular proportions of nitric acid to benzene being approximately 2–2.1:1, the steps which comprise adding to benzene maintained at a temperature in the range of about 30–60° C. a mixture of sulfuric acid and nitric acid containing said molar quantity of nitric acid and sufficient sulfuric acid to provide said weight ratio of sulfuric acid to nitric acid in the reaction mixture, then finishing the nitration at a temperature of not more than 80° C.

2. In a process for the preparation of m-dinitrobenzene by the reaction of benzene with nitric acid in admixture with sulfuric acid at a temperature in the range of 30–80° C., the ratio in parts by weight of sulfuric acid to nitric acid incorporated in the reaction mixture being 3–6:1 and the ratio in molecular proportions of nitric acid to benzene being approximately 2–2.1:1, the steps which comprise adding to benzene maintained at a temperature in the range of about 30–60° C. a mixture of sulfuric acid and nitric acid containing said molar quantity of nitric acid and sufficient sulfuric acid to provide said weight ratio of sulfuric acid to nitric acid in the reaction mixture until all of the mixture of acids has been added, then finishing the nitration at a temperature in the range of from 60° C. to about 80° C.

3. In a process for the preparation of m-dinitrobenzene by the reaction of benzene with nitric acid in admixture with sulfuric acid, the ratio in parts by weight of sulfuric acid to nitric acid incorporated in the reaction mixture being approximately 4:1 and the ratio in molecular proportions of nitric acid to benzene being approximately 2–2.1:1, the steps which comprise adding to benzene maintained at a temperature in the range of about 50–60° C. a mixture of sulfuric acid and nitric acid containing said molar quantity of nitric acid and sufficient sulfuric acid to provide said weight ratio of sulfuric acid to nitric acid in the reaction mixture until all of the mixture of acids has been added, then finishing the nitration at a temperature in the range of from 60° C. to about 80° C.

4. In a process for the preparation of m-dinitrobenzene by the reaction of benzene with nitric acid in admixture with sulfuric acid, the ratio in parts by weight of sulfuric acid to nitric acid incorporated in the reaction mixture being approximately 4:1 and the ratio in molecular proportions of nitric acid to benzene being approximately 2.06:1, the steps which comprise adding to benzene maintained at a temperature of about 50° C. a mixture of sulfuric acid and nitric acid containing said molar quantity of nitric acid and sufficient sulfuric acid to provide said weight ratio of sulfuric acid to nitric acid in the reaction mixture until about five-sixths of the mixture of acids has been added, increasing the reaction temperature to about 60° C. and adding the remaining one-sixth portion of the mixture of acids, and finishing the nitration at a temperature of about 80° C.

GEORGE E. TAYLOR.
LAURENCE P. RUSSE.

References Cited in the file of this patent

UNITED STATES PATENTS

| Number | Name | Date |
|---|---|---|
| 2,435,544 | Kokatnur | Feb. 3, 1948 |

OTHER REFERENCES

Groggins, "Unit Processes in Organic Synthesis," p. 49 (1943). McGraw-Hill Book Co., Inc., New York, N. Y.